W. R. CLARKSON.
SWIVEL HOOK.
APPLICATION FILED NOV. 27, 1908.

931,270.

Patented Aug. 17, 1909.

William R. Clarkson, Inventor

By C. A. Snow & Co.
Attorneys

Witnesses

UNITED STATES PATENT OFFICE.

WILLIAM R. CLARKSON, OF TENINO, WASHINGTON.

SWIVEL-HOOK.

No. 931,270.     Specification of Letters Patent.     Patented Aug. 17, 1909.

Application filed November 27, 1908. Serial No. 464,600.

*To all whom it may concern:*

Be it known that I, WILLIAM R. CLARKSON, a citizen of the United States, residing at Tenino, in the county of Thurston and State of Washington, have invented a new and useful Swivel-Hook, of which the following is a specification.

It is the primary object of the present invention to provide an improved structure of swiveled hook, such as used for suspending the block and tackle of hoisting apparatus and the like.

One of the novel features of the invention resides in so constructing the hook and its head that the device may be so adjusted as to permit turning of the hook with respect to the head, or to prevent such turning, and hold the hook rigid with respect to the head.

Other novel features of the invention will be apparent from the specific description which is to follow, and from the drawings, in which:—

Figure 1:
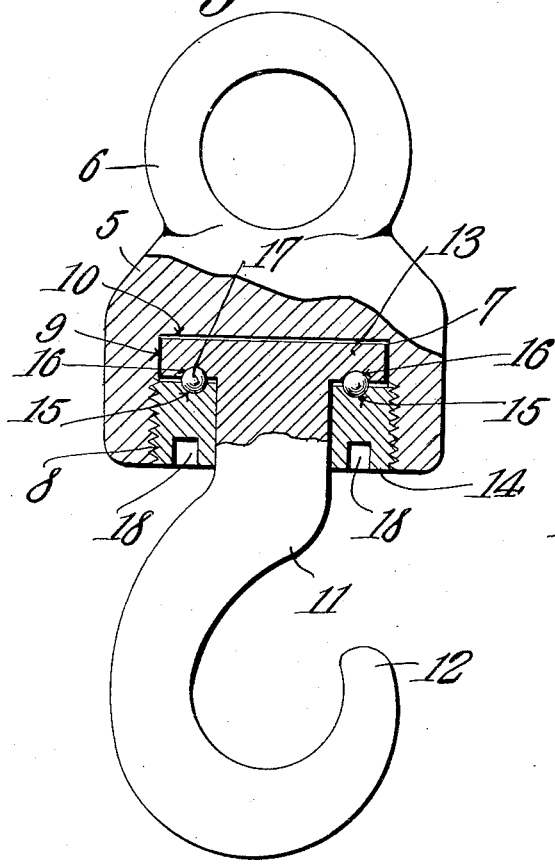
Figure 2:
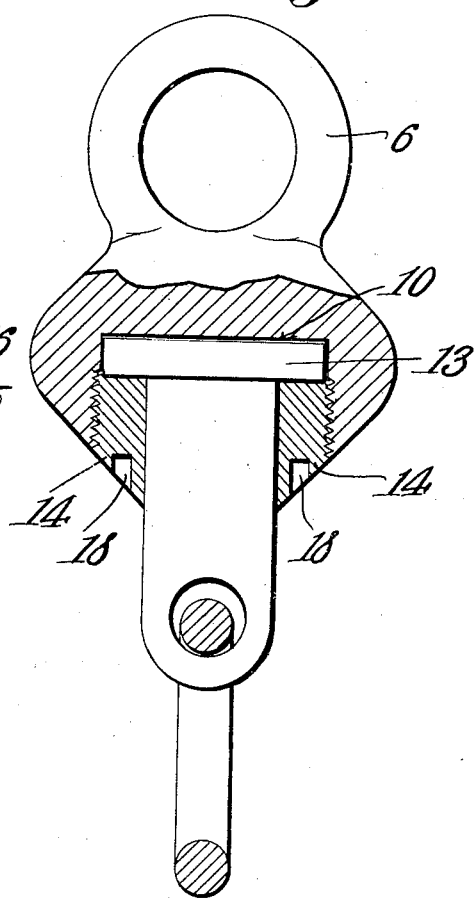
Figure 3:
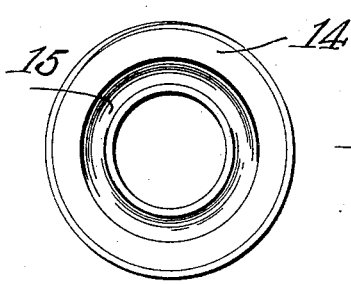

Figure 1 is a view, partly in elevation and partly in section, of a hook embodying the invention. Fig. 2 is a similar view, showing a slight modification of the invention. Fig. 3 is a detail plan view of the adjusting collar.

In the drawings the device is illustrated as comprised of a head member and a hook member, which, as heretofore stated, are so connected as to permit of adjustment to allow for turning of the hook member with respect to the head member, or to hold the said hook member against such turning movement.

The head member is preferably in the form of a substantially cylindrical body 5, formed with a ring or other suitable element for the attachment of a cable or the engagement of a hook or the like, indicated by the numeral 6, and the said body 5 is formed with a cylindrical recess 7, the cylindrical wall of which is threaded, from the open end of the recess to a point near the bottom of the same, as indicated by the numeral 8, the remainder of the said wall being plain, as indicated by the numeral 9. The flat or bottom wall of the recess is indicated by the numeral 10, and affords a bearing surface for the head of the hook member, as will be presently explained.

The hook member comprises a short shank 11, and a bill 12, and the shank is formed, at its upper end, with a flat circular head 13, which is of such size as to fit rotatably within the bottom of the recess 7, the upper flat face of the head 13 bearing more or less firmly against the bottom wall 10 of the recess.

Threaded into the recess 7 is a collar 14, which snugly fits about the shank 11 of the hook member, but in such manner as to permit of free turning of the said hook member with respect to the collar, or, in other words, to permit of rotation of the shank 11 of the said hook member in the collar.

As will be understood, from an inspection of the drawings, this collar 14 serves the function of confining the head 13 of the hook member within the recess 7, and the said collar 14 is formed in its upper flat face with a ball race 15, which registers with a corresponding race 16, formed in the under face of the head 13 of the hook member of the device, there being received in these races anti-friction ball bearings 17, which permit of free rotation of the hook member with respect to the head member 5 when it is desired that a swivel connection be had between the two members.

As shown in the drawings, the collar 14 is formed in its under face with a plurality of sockets 18, in which may be engaged the lugs of a spanner wrench, which is to be manipulated to screw the collar into the recess or unscrew the same to the proper degree; and it will be further understood that when it is not desired to have the hook member turn with respect to the head member in the manner of a swivel connection, it is only necessary that the collar 14 be tightly screwed into the recess so as to cause the head 13 of the hook member to bear firmly with its upper face against the flat or bottom wall 10 of the said recess, the frictional engagement of the head with the said bearing surface or face of the head member serving to prevent turning of the hook member with respect to the head member.

In the form of the invention shown in Fig. 2 of the drawings, the ball bearings 17 and the ball races 15 and 16 are eliminated from the device, and the upper face of the collar 14 forms a bearing surface for the under face of the head 13, as does the bottom wall 10 for the upper face of the said head 13.

The fact will be appreciated that there are numerous advantages accruing from the construction above described, and that the device is adaptable for use where either a swiveled or fixed hook is to be employed. Furthermore, it will be understood that, instead of a hook member 11, a member carrying a ring or other suitable attaching element, may be employed in connection with the head member 5.

What is claimed is:—

1. In a device of the class described, a head member formed with a recess, a hook member having a head, and a member within said recess confining the head of the hook member between it and one wall of the recess.

2. In a device of the class described, a head member formed with a recess, a hook member having a head, and a member adjustably received within the said recess confining the head of the hook member between it and one wall of the recess.

3. In a device of the class described, a head member formed with a recess, a hook member having a head, and a member removably received within said recess and confining the head of the hook member between it and one wall of the recess.

4. In a device of the class described, a head member formed with a recess, a hook member having a head, and a member threaded into said recess and confining the head of the hook member more or less firmly between it and one wall of the recess.

5. In a device of the class described, a head member having a recess, one wall of which constitutes a bearing surface, a hook member having a head received in said recess, and means within the recess for affording a swivel bearing for said head, and for adjusting the head with respect to the bearing surface of the head member.

In testimony that I claim the foregoing as my own, I have hereto affixed my signature in the presence of two witnesses.

WILLIAM R. CLARKSON.

Witnesses:
   JAS. M. WALKER,
   J. ROSS COLHOUN.